United States Patent
Mayer et al.

(10) Patent No.: US 10,586,316 B2
(45) Date of Patent: Mar. 10, 2020

(54) REDUCTION OF GLARE IN IMAGING DOCUMENTS

(71) Applicant: MorphoTrust USA, LLC, Billerica, MA (US)

(72) Inventors: Joseph R. Mayer, Billerica, MA (US); James R. Queenan, Billerica, MA (US); Brian K. Martin, McMurray, PA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 16/057,470

(22) Filed: Aug. 7, 2018

(65) Prior Publication Data

US 2019/0043180 A1 Feb. 7, 2019

Related U.S. Application Data (60) Provisional application No. 62/541,988, filed on Aug. 7, 2017, provisional application No. 62/542,009, filed on Aug. 7, 2017.

(51) Int. Cl.
*G06T 5/50* (2006.01)
*H04N 5/235* (2006.01)
(Continued)

(52) U.S. Cl.
CPC ............... *G06T 5/50* (2013.01); *G06T 5/005* (2013.01); *G06T 7/337* (2017.01); *G06T 7/74* (2017.01);
(Continued)

(58) Field of Classification Search
CPC ............. G06T 5/50; G06T 2207/30168; G06T 2207/30176; G06T 5/005; G06T 7/337;
(Continued)

(56) References Cited

U.S. PATENT DOCUMENTS 8,797,417 B2 * 8/2014 Gayko .................... G06T 5/005
348/154
9,503,612 B1 11/2016 Pashintsev et al.
(Continued)

FOREIGN PATENT DOCUMENTS

WO WO/2013/090843 6/2013
WO WO/2017/084940 5/2017

OTHER PUBLICATIONS

PCT International Search Report and Written Opinion in International Application No. PCTAJS2018/045609, dated Oct. 10, 2018, 18 pages.

*Primary Examiner* — Shahbaz Nazrul
(74) *Attorney, Agent, or Firm* — Fish & Richardson P.C.

(57) ABSTRACT

Methods, systems, and apparatus, including computer programs encoded on a computer storage medium, for obtaining a first image of a document, the first image including first glare shown on a first portion of the document. Detecting, in the first image, the first glare shown on the first portion of the document. In response to detecting the first glare in the first image, obtaining a second image of the document, the second image including second glare shown on a second portion of the document. Generating, from the first image and the second image, a third image of the document that includes less glare than the first glare in the first image and less glare than the second glare in the second image.

18 Claims, 8 Drawing Sheets

(51) Int. Cl.
  *G06T 7/00* (2017.01)
  *H04N 5/232* (2006.01)
  *H04N 5/217* (2011.01)
  *G06T 5/00* (2006.01)
  *H04N 1/40* (2006.01)
  *G06K 9/00* (2006.01)
  *G06K 9/46* (2006.01)
  *G06T 7/73* (2017.01)
  *G06T 7/33* (2017.01)
  *H04N 1/409* (2006.01)
  *H04N 1/387* (2006.01)

(52) U.S. Cl.
  CPC ........... *H04N 1/4097* (2013.01); *H04N 5/217* (2013.01); *H04N 5/2351* (2013.01); *H04N 5/23222* (2013.01); *G06K 9/00483* (2013.01); *G06K 9/46* (2013.01); *G06T 2207/10016* (2013.01); *G06T 2207/10024* (2013.01); *G06T 2207/20221* (2013.01); *G06T 2207/30168* (2013.01); *G06T 2207/30176* (2013.01); *H04N 1/3871* (2013.01)

(58) Field of Classification Search
  CPC ............. G06T 7/74; G06T 2207/10024; G06T 2207/10016; G06T 2207/20221; H04N 5/217; H04N 1/4097; H04N 5/23222; H04N 5/2351; H04N 1/3871; G06K 9/00483; G06K 9/46
  See application file for complete search history.

(56) References Cited

U.S. PATENT DOCUMENTS

| | | |
|---|---|---|
| 9,742,952 B2 | 8/2017 | Gibbons |
| 9,911,395 B1 | 3/2018 | Townsend et al. |
| 2014/0002722 A1 | 1/2014 | Cook et al. |
| 2014/0375862 A1 | 12/2014 | Kim et al. |
| 2015/0117849 A1 | 4/2015 | Kasahara et al. |
| 2015/0187056 A1 | 7/2015 | Nakamae et al. |
| 2016/0042544 A1* | 2/2016 | Moesle .............. G06K 9/00818 345/629 |
| 2016/0073035 A1 | 3/2016 | Yamamoto |
| 2016/0330374 A1 | 11/2016 | Ilic et al. |

\* cited by examiner

REDUCTION OF GLARE IN IMAGING DOCUMENTS

CROSS-REFERENCE TO RELATED APPLICATION

This application claims the benefit of the filing date of U.S. Provisional Application No. 62/542,009, filed on Aug. 7, 2017; and U.S. Provisional Application No. 62/541,988, filed on Aug. 7, 2017. The contents of U.S. Application Nos. 62/542,009 and 62/541,988 are incorporated herein by reference in their entirety.

TECHNICAL FIELD

This disclosure generally relates to image capture.

BACKGROUND

Digital cameras are capable of capturing images of documents. However, the quality of a captured image can be degraded due to reflections or glare spots on the document. Improvements to digital image capture devices and processes that reduce or eliminate reflections or glare on imaged documents are desirable

SUMMARY

This specification relates to improvements to image capture devices (e.g., digital cameras) to prevent, reduce, or eliminate glare from images captured by the device. Implementations of the present disclosure are generally directed to systems, devices, and methods for processing a series of images to generate a final image that has minimal or no glare.

In general, innovative aspects of the subject matter described in this specification can be embodied in methods that include the actions of obtaining a first image of a document, the first image including first glare shown on a first portion of the document. Detecting the first glare shown in the first image on the first portion of the document. In response to detecting the first glare in the first image, obtaining a second image of the document, the second image including second glare shown on a second portion of the document. Generating, from the first image and the second image, a third image of the document that includes less glare than the first glare in the first image and less glare than the second glare in the second image. Other implementations of this aspect include corresponding systems, apparatus, and computer programs, configured to perform the actions of the methods, encoded on computer storage devices.

These and other implementations can each optionally include one or more of the following features.

Some implementations include, in response to detecting the first glare in the first image, providing, by the one or more processors, an indication on a display to obtain a second image of the document.

In some implementations, generating the third image of the document includes extracting a first set of features from the first image and a second set of features from the second image, and generating the third image by populating a document template with, at least, the first set of features and the second set of features.

In some implementations, obtaining the second image of the document includes capturing a stream of multiple images in response to detecting the first glare in the first image, where the second image is one of the multiple images.

Some implementations include determining that the third image satisfies a threshold value for a reduction of glare based on a comparison with one or more document templates.

In some implementations, generating the third image includes: generating a first glare map from the first image, the first glare map indicating a location of the first portion of the document that includes the first glare; registering the second image to the first image to provide a registered image; generating a second glare map from the registered image, the second glare map indicating a location of the second portion of the document that includes the second glare; and generating, from the first image and the registered image, the third image based on the first glare map and the second glare map.

In some implementations, the third image is a reconstruction of the first image using a set of pixels from the registered image that do not include the second glare.

Some implementations include, in response to determining that the third image includes a third glare, generating a third glare map indicating a location of a third portion of the document that includes the third glare; obtaining a fourth image of the document, the fourth image including fourth glare shown on a fourth portion of the document; registering the fourth image to the third image to provide a new registered image; generating a fourth glare map from the new registered image, the fourth glare map indicating a location of the fourth portion of the document that includes the fourth glare; and generating, from the third image and the new registered image, a fifth image of the document based on the third glare map and the fourth glare map, wherein the fifth image includes less glare than the third glare in the third image and less glare than the fourth glare in the fourth image.

These and other implementations can each provide one or more advantages. In some examples, implementations of the present disclosure improve the operation image capture devices by, for example, removing glare from images captured by the image capture device. Implementations may provide processes for reducing or eliminating glare from images of documents captured by digital image capture devices.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

A document may be imaged to generate a digitized copy of the document. For example, a document may be imaged by taking a photo of a document with a capture device. A digital capture device may include a mobile computing device with a camera, e.g., a phone with a camera, a tablet with a camera, a standalone digital camera, or some other device that can capture a digital image of a view.

However, acquisition of a digitized copy of a document with a photo or video capture device may be corrupted by the presence of glare. Glare on a document may refer to brightness that obscures underlying characteristics of the document. Glare may make data extraction from a digital copy difficult or impossible. For example, glare shown on a portion of a document may make it impossible to perform optical character recognition on portions of the image that show glare.

Mild glare effects, or simple overexposure, may be corrected to some extent with image post processing operations to improve contrast in the affected areas. However, glare that completely obscures all underlying features may not be recoverable in this way. For example, if a large portion of an image of a document is pure white because of glare on the document, it may be impossible to extract features from that portion of the document.

Glare may be especially problematic in imaging identification documents such as driver's licenses or passports. These identification documents may be used to verify ages, prove driving privileges, access a secure area, cash a check, and so on, so correctly extracting all features of the document is important. Additionally, identification documents are often targets for counterfeiting and fraud so correctly extracting embedded security features may be important to prove the authenticity of the documents. Additionally, identification documents are frequently laminated which may make the documents more reflective and more prone to showing glare than unlaminated documents.

Identification documents ("ID documents") are broadly defined to include, for example, credit cards, bank cards, phone cards, passports, driver's licenses, network access cards, employee badges, debit cards, security cards, visas, immigration documentation, national ID cards, citizenship cards, permanent resident cards (e.g., green cards), Medicare cards, Medicaid cards, social security cards, security badges, certificates, identification cards or documents, voter registration cards, police ID cards, military ID cards, border crossing cards, legal instruments, security clearance badges and cards, gun permits, gift certificates or cards, membership cards or badges, etc. Also, the terms "document," "card," "badge" and "documentation" are used interchangeably throughout this patent application.

Glare detection through image processing can be used to advise a user during capture that an image is corrupt and prompt the user to correct the capture setup to remove the glare. Correcting a capture setup may include one or more of changing the environment (lighting), moving the capture device, or moving the subject document. For example, a light may be repositioned, the capture device may be moved to a position where no glare appears on the document relative to the capture device, or the angle that a document is being held may be changed so that no glare appears for the capture device. However, depending on document and lighting characteristics, it is sometimes impractical or impossible to completely remove glare from a single captured image in a given environment.

Accordingly, glare can be reduced in imaging a document by producing a final digital image of a document with reduced or eliminated glare effects from collection of a video stream or multiple images from one or more capture devices. The environment (lighting), the capture device, or the subject document, or any combination of the three, can be modified between samples such that there exists multiple capture samples with variable manifestations of glare. The final digital image of the document can then provide improved data detection and extraction capabilities compared to any single image that was captured due to reduced glare on the document in the final digital image.

The document that is imaged may be an ID document, as described above, and the final digital image of the ID document with reduced glare can be used to authenticate the ID document or identity of person that presents the ID document. For example, embedded visual security features can be extracted from the final digital image of the ID document and used to authenticate the ID document, or an image of the person extracted from the final digital image of the ID document can be compared to an image of a person captured at the time of authentication.

Figure 1A:
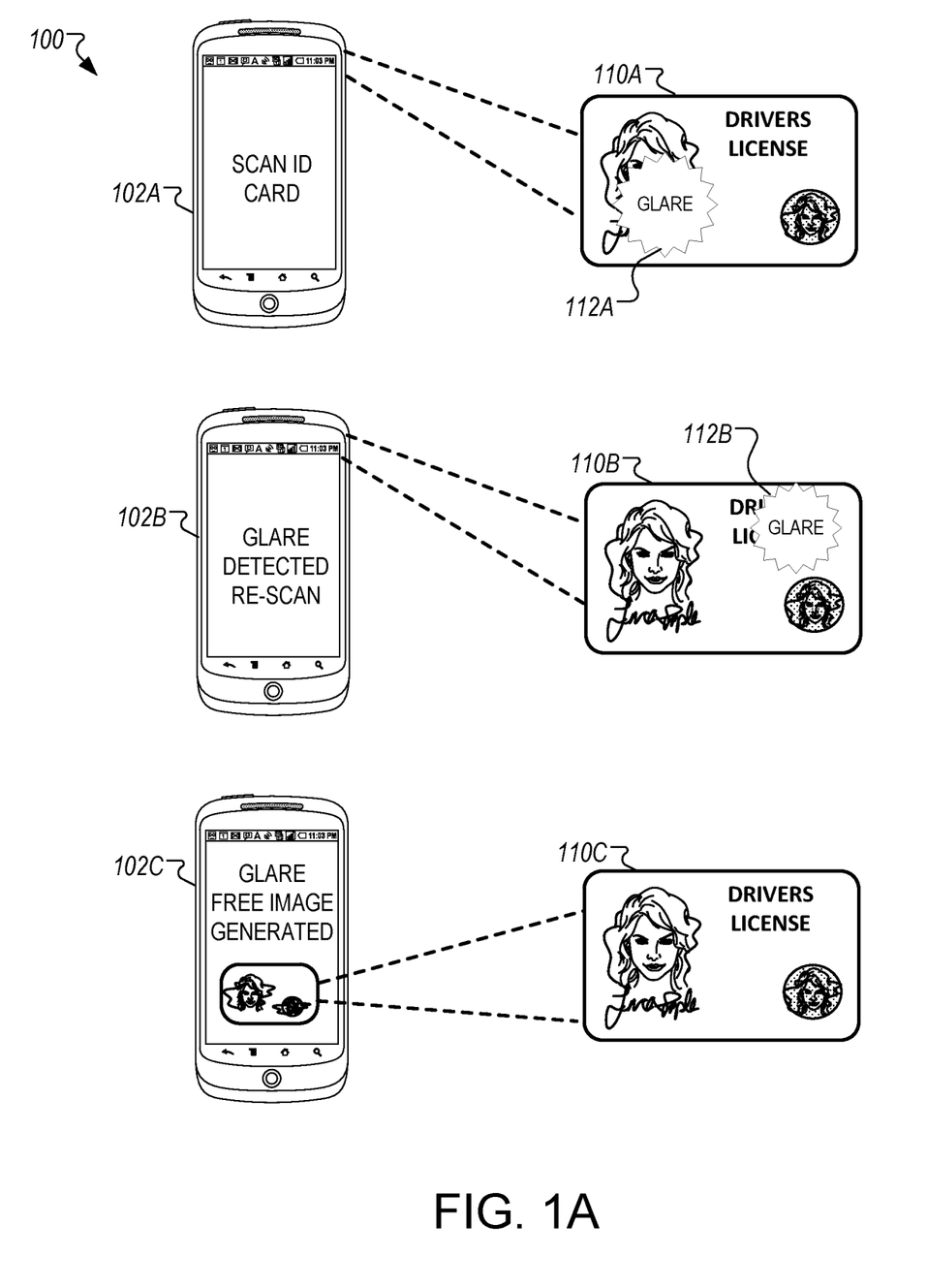
FIG. 1A depicts a series of diagrams illustrating an exemplary glare reduction process, according to implementations of the present disclosure.

FIG. 1A depicts a series of diagrams illustrating an exemplary glare reduction process 100. The process 100 can be performed by a capture device 102A, 102B, 102C (collectively referred to as 102). In FIG. 1, the capture device 102 is shown as a mobile computing device with a camera that can be used by a user to scan a document to generate images 110A, 110B, 110C (collectively referred to as 110). In FIG. 1A, the document is shown as a driver's license.

As depicted in FIG. 1A, initially the capture device 102 displays "Scan ID card" on a display and captures a first image 110A of the document that includes glare 112A that obscures an image of a person on the document. The capture device 102 detects that the first image 110A includes glare. In response, the capture device 102 provides an indication on a display of the capture device 102 to obtain a second image 110B of the document. As shown in FIG. 1, the capture device 102 detects glare 112A in the first image 110A and, in response, provides a prompt "Glare detected, re-scan" on a display of the capture device 102. For example, the capture device 102 can detect glare 112A using image processing techniques such as edge or contrast detection. The capture device 102 can be a computing device such as, but is not limited to, a smartphone, a tablet computer, a laptop computer, or a digital camera.

The user sees the indication and, in response, may modify the environment (lighting), the capture device, or the document. The capture device 102 can obtain the second image 110B of the document after the modification. For example, the user may move the document so that glare is no longer shown on an image of a person on the document and is instead shown on the text "Driver's License" of the document. In another example, the user may move the capture device 102 so that glare is no longer shown on an image of a person on the document and is instead shown on the text "Driver's License" of the document.

The capture device 102 can then generate the third image 110C of the document from the first image and the second image. As shown in FIG. 1A, the third image 110C shows less glare than shown by the first image 110A and shown by the second image 11B since the third image 110C does not include glare over an image of the person or glare over the text "Driver's License" of the document. The third image 110C can be used to extract data that reflects data in the document. For example, as described in more detail below in reference to FIGS. 3A-3B, the capture device 102 can construct the third image from portions of the first and second image that do not include glare 112A, 112B.

In some implementations, the capture device 102 can capture a series of two or more images of the document to generate a final image of the document that shows less glare than the glare shown in any of the individual captured images. For example, capture device 102 can display "Glare detected re-scan" and, without additional user input, capture a stream of three or more images until the capture device 102 has a set of images that can be used to generate a final image that satisfies a threshold. In the example, once the capture device 102 determines it has a set of images that can be used to generate a final image that satisfies the threshold, the capture device 102 can stop displaying an indication to obtain another image of the document and display the final image generated from the set of images.

Figure 1B:
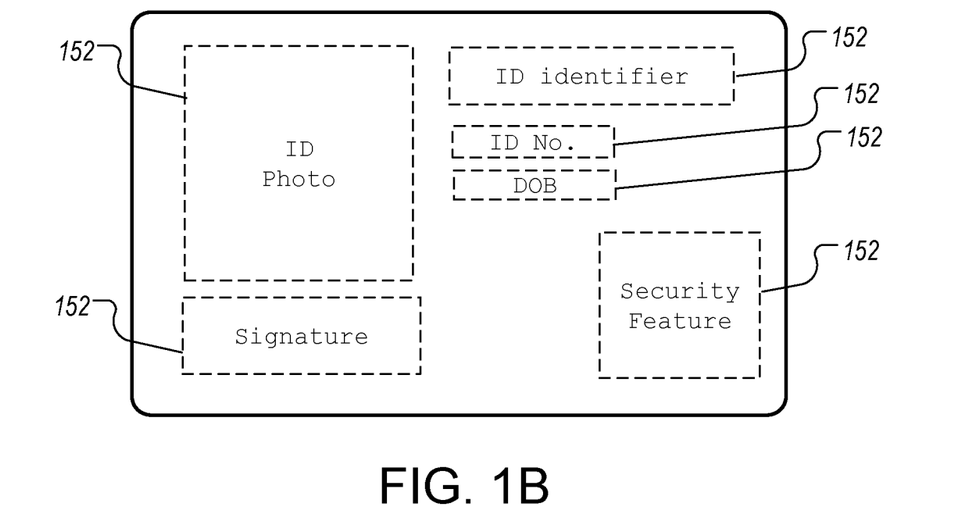
FIG. 1B depicts a diagram of an exemplary document template, according to implementations of the present disclosure.

In some implementations, the capture device 102 determines whether the captured images satisfy a threshold based on a comparison with one or more document templates. Document templates can be specific to different types of documents. For example, a capture device 102 can store or access (e.g., from a server) a document templates for documents that include, but are not limited to, driver's licenses (e.g., each state license may have a different template), security badges, passports, student identification cards, birth certificates, concealed carry licenses, and military identification cards. An exemplary document template 150 for a driver's license is illustrated in FIG. 1B. The capture device 102 can identify features in one or more captured images of the document and determine whether the features match expected features 152 of a document as defined by a template 150 for the particular document. For example, the capture device 102 can identify particular text, colors, and images shown on a person's driver's license from the state of "Virginia" and determine that the identified text, colors, and images match all text, colors, and images that a template for a driver's license from Virginia specifies should appear.

A template 150 for a particular document can specify the location and attributes of one or more document features 152 including, but not limited to, text, images, and types of data that should appear in the particular document and where in the document the text, images, and types of data should appear. For example, a template 150 for a driver's license from Virginia may specify that a portrait of a person appear on a left hand side, a signature appear below the portrait, the text "VA Driver's License" appear in the upper right portion, a driver's license number appear below the text "VA Driver's license, a date of birth appear below the driver's license number, and a security feature (e.g., a see through small portrait of a person) appear in the bottom right portion.

If the capture device 102 determines that features match features of a template 150 for a particular document, the capture device 102 can determine no further images of the document need to be captured and that a final image can be satisfactorily generated from the existing images. If the capture device 102 determines that features do not match features of a template for a particular document, the capture device 102 can determine further images of the document need to be captured until features match features of a template for the particular document.

In a more detailed example of determining whether features 152 match, the capture device 102 can determine that a template for a driver's license from Virginia specifies that the text "Name" appears in the middle of the document and text for a name appears below the text "Name." If the capture device 102 determines that none of the captured images show the text "Name" in the middle of the document, or none of the captured images show text for a name below the text "Name," then the features of the image do not match features of the template for a driver's license from Virginia.

Figure 1C:
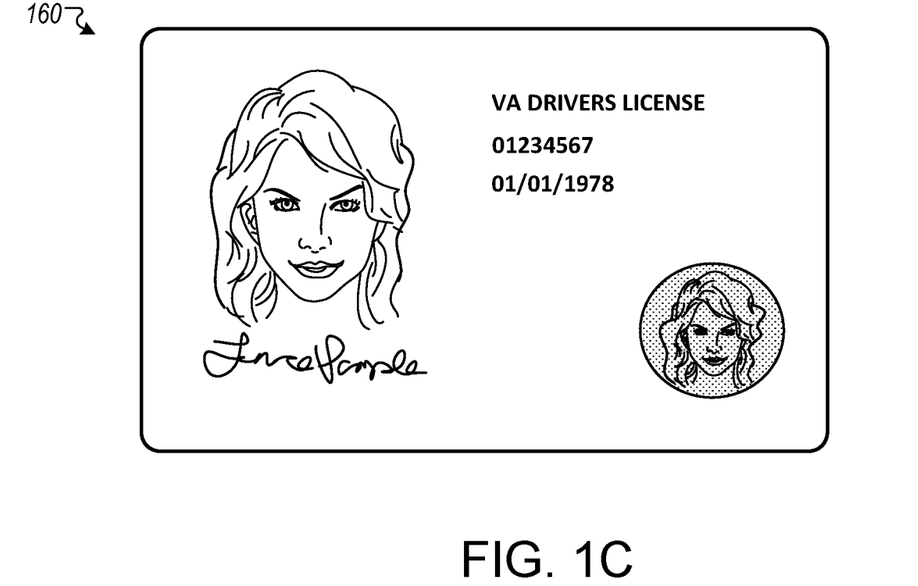
FIG. 1C depicts a diagram of an exemplary reconstructed document, according to implementations of the present disclosure.

In some implementations, the capture device 102 can generate the third image as a virtual representation of the document based on the document template 150. For example, the capture device 102 can extract different sets of document features 152 that are not obstructed by glare from each of a series of two or more images of the document. For example, referring to FIGS. 1A-1C, the capture device 102 can extract a set of one or more document features that are not obstructed by glare 112A from the first image 110A of the document, and extract a second set of one or more document features that are not obstructed by glare 112B from the second image 110B of the document. The capture device 102 can generate the third image 110C of the document as a virtual representation 160 (shown in FIG. 1C) of the document by populating the document template 150 with the features extracted from the first and second images.

In some implementations, while capturing images, the capture device 102 can indicate a progress of capturing on a display a portion of the document. For example, the capture device 102 can indicate portions of the document that have been captured without glare in at least one of the images, e.g., through highlighting or outlining the sufficiently captured portions or highlighting or outlining insufficiently captured portions. Accordingly, a user may see progress as additional portions of the document are sufficiently captured as additional images are taken of the document. In some implementations, the capture device 102 can indicate a progress based on a template. For example, the capture device 102 can determine that features detected in images of a document match nine out of ten features specified by a template and, in response, display, "Nine out of ten features detected for a Virginia Driver's License. Expiration Date still not extracted."

Figure 2:
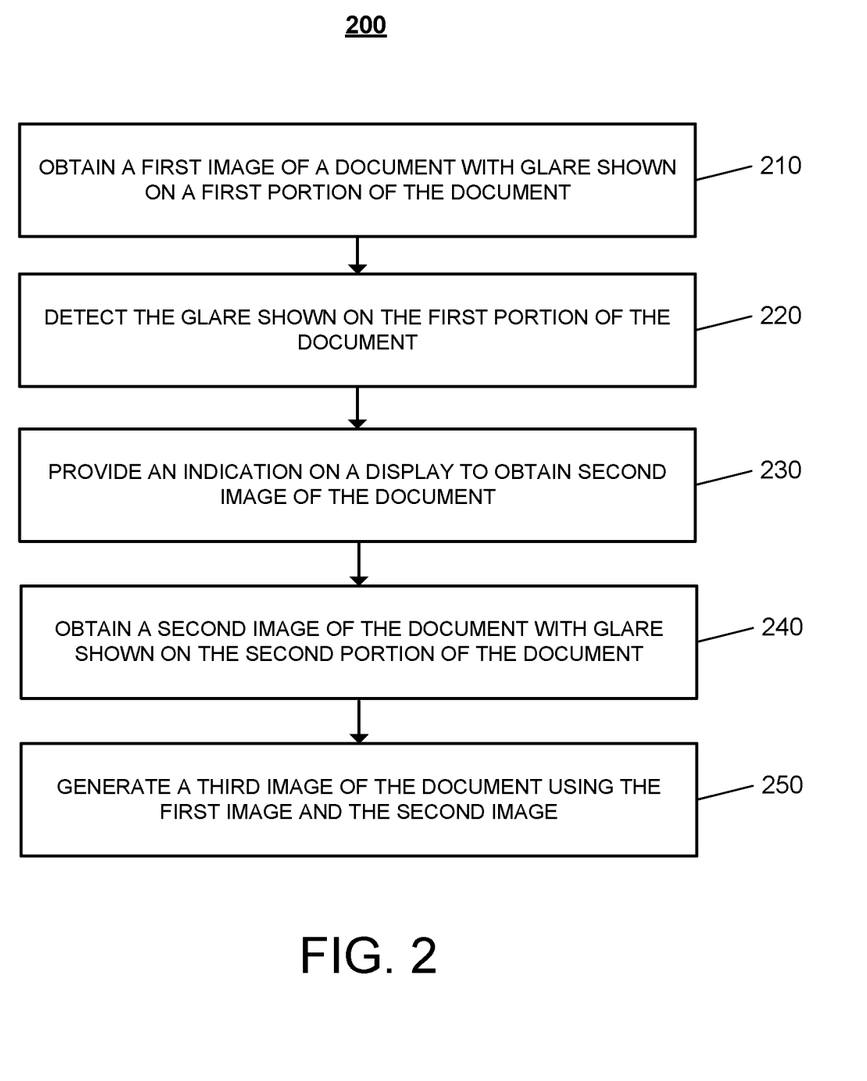
FIG. 2 is a flowchart of the process illustrated in FIG. 1A for the reduction of glare in imaging a document, according to implementations of the present disclosure.

FIG. 2 is a flowchart of an example process 200 for the reduction of glare in imaging a document. The process 200 includes obtaining a first image of a document with glare shown on a first portion of the document (210). For example, the capture device 102 can obtain a first image 110A of a document where glare 112A is shown over an image of a person.

The process 200 includes detecting, in the first image, the glare shown on the first portion of the document (220). For example, the capture device 102 can detect a large circular white portion in the first image 110A and determine the large circular white portion corresponds to glare. For example, the capture device 102 can implement image processing techniques such as edge detection to detect the shape, location, and other attributes of the glare.

The process 200 includes, in response to detecting, in the first image, glare on the document, providing an indication on a display to obtain a second image of the document (230). For example, in response to detecting a large circular white portion in the first image 110A, the capture device 102 can display "Glare detected re-scan" on a display of the capture device 102.

The process 200 includes obtaining the second image of the document with glare shown on the second portion of the document (240). For example, the capture device 102 can obtain the second image 110B where glare is shown over the text "Driver's License."

The process 200 includes generating, from the first image and the second image, a third image of the document that shows less glare than shown by the first image and less glare than shown by the second image (250). For example, the capture device 102 can generate the third image 110C that does not include glare 112A over a picture of a person as shown in the first image 110A and does not include glare 112B over the text "Driver's License" as shown in the second image 110B, where the capture device 102 generates the third image 110C from the first image 110A and the second image 110B.

Figure 3A:
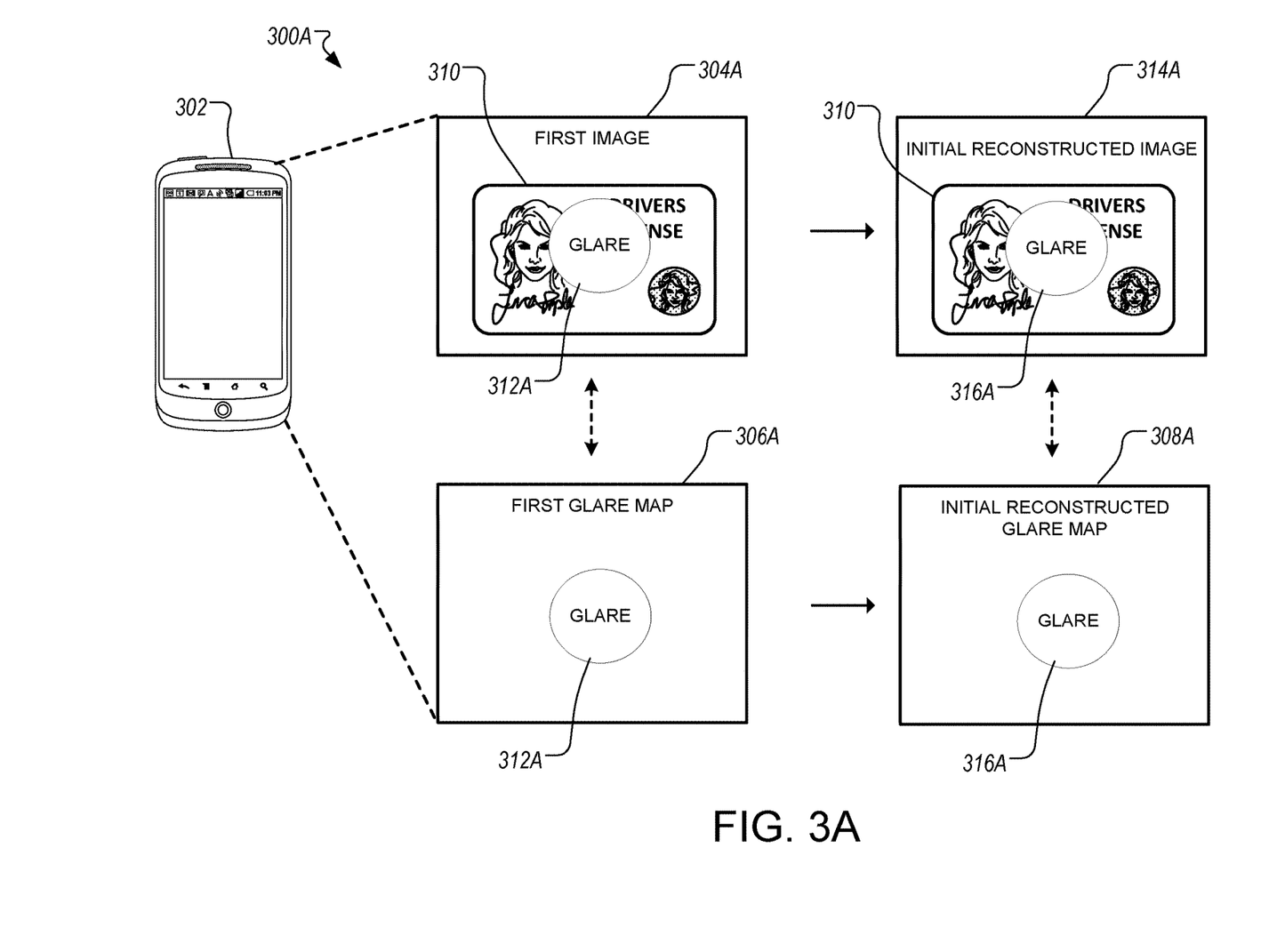
FIGS. 3A-3C depict a series of diagrams illustrating another exemplary glare reduction process in document imaging, according to implementations of the present disclosure.
Figure 3B:
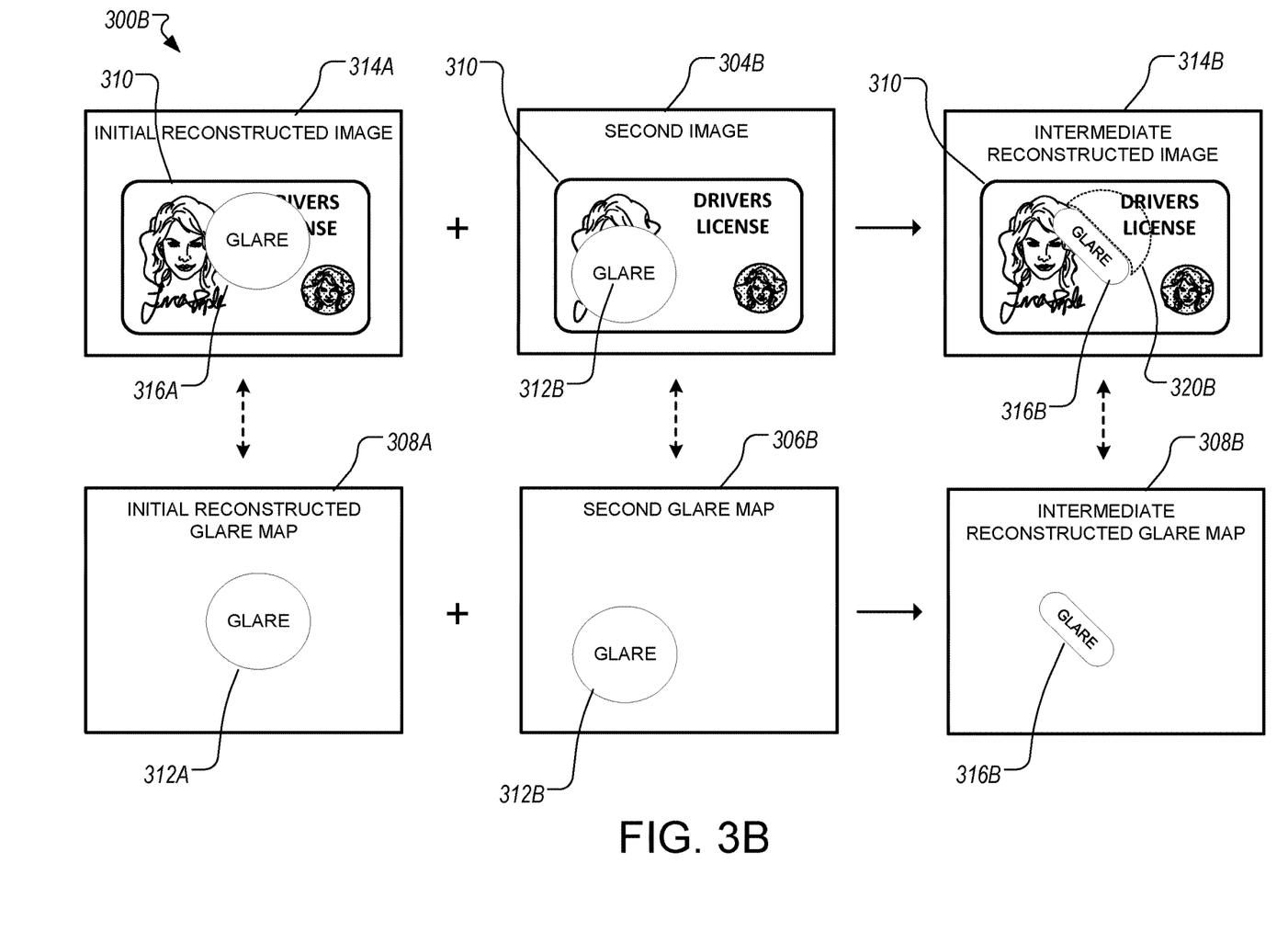
Figure 3C:
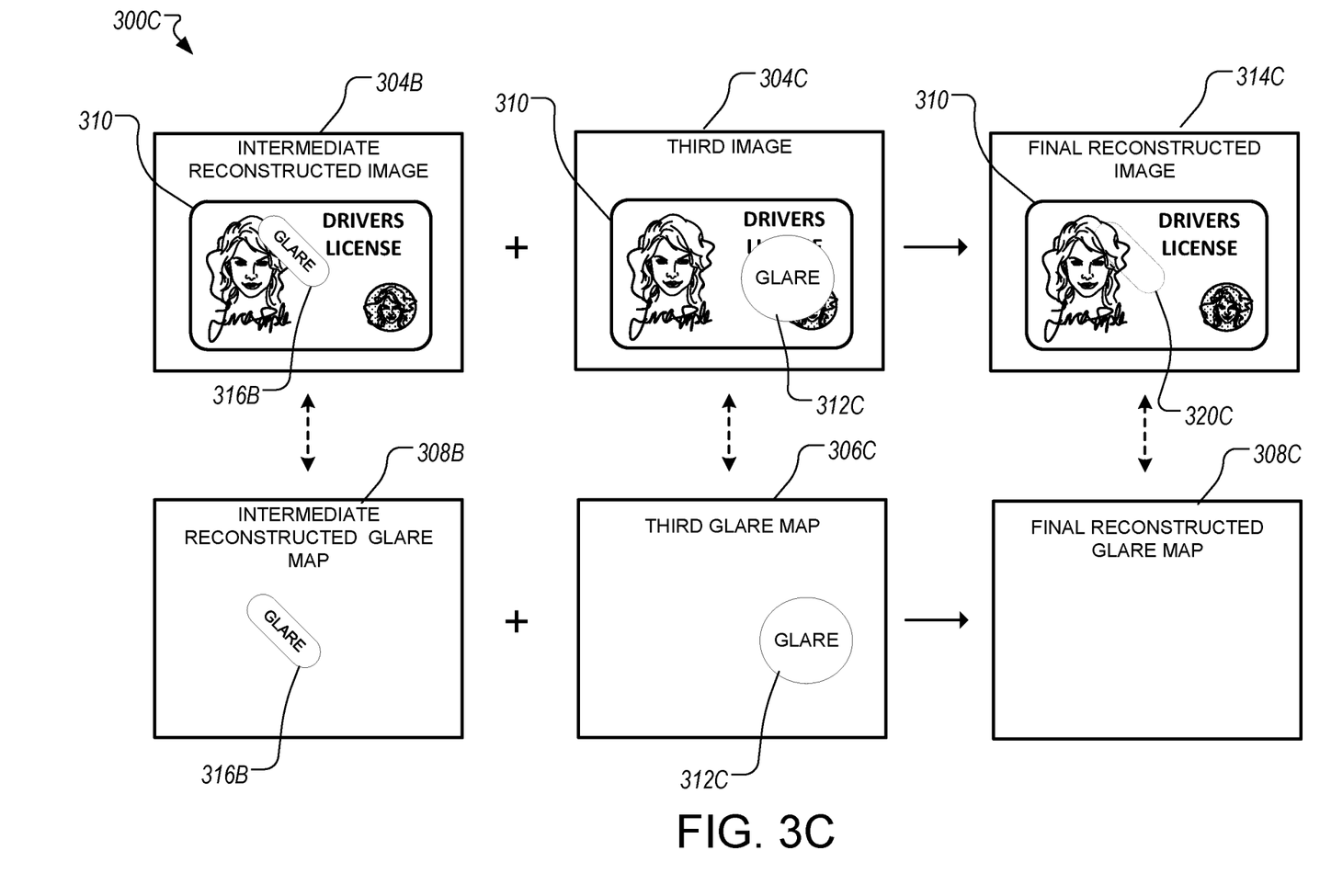

FIGS. 3A-3C depict a series of diagrams 300A, 300B, 300C that illustrate a process 300 for reducing glare in images of documents. Diagrams 300A, 300A, 300B, 300C collectively represent, and are referred to as, process 300. The process 300 can be performed by an image capture device 302 such as a mobile computing device. In executing process 300, capture device 302 can obtain a set of images of a document 310 where glare 312A, 312B, 312C appears in different portions of the images. For example, the process 300 is illustrated using three images of a document 310 where glare 312A is shown in the middle of a first image 304A, glare 312B is shown on a left side of a second image 304B, and glare 312C is shown on a right side of a third image 304C. However, depending on varying circumstances, process 300 can be performed using two or more images of a document. For example, process 300 may be completed with as few as two images if the glare in each of the images does not overlap. However, in other circumstances, process 300 may use four or more images to generate a reduced-glare or glare-free image of a document.

The capture device 302 can be a computing device such as, but is not limited to, a smartphone, a tablet computer, a laptop computer, or a digital camera. The capture device 302 can include a buffer for a reconstructed image and a buffer for a reconstructed glare map. The buffer for a reconstructed image can store data from images where glare is not shown in the data. The buffer for a reconstructed glare map can store data that indicates portions of the reconstructed image that show glare and portions of the reconstructed image that do not show glare. The buffer for the reconstructed image and the buffer for the reconstructed glare map can be updated as the capture device 302 analyzes additional images.

As shown in FIG. 3A, the capture device 302 can obtain a first image 304A and generate a first glare map 306A from the first image 304A. For example, the capture device 302 obtains a first image 304A with a circular area in the middle of the first image 304A showing glare 312A. The capture device 302 can detect the glare 312a and generate a first glare map 306A that indicates the presence of glare 312A in the middle of the first image 304A.

In some implementations, the first glare map 306A can represent pixels of the first image 304A, where each pixel in the glare map 306A can be represented by a binary value that reflects either the presence of glare 312A or the absence of glare 312A in the first image 304A. For example, the capture device 302 can generate a glare map 306A that has a same resolution as the first image 304A, and for each position that glare 312A is detected in the first image 304A, store a value of "1" and for each position that glare 312A is not detected in the first image 304A, store a value of "0." Accordingly, for example, a pixel that is one hundred pixels up and two hundred pixels right of a bottom left corner of the first glare map 306A may have a value of "0" to indicate that a pixel that is one hundred pixels up and two hundred pixels right of a bottom left corner of the first image 304A does not include glare 312A. Conversely, for example, a pixel that is one hundred pixels up and two hundred pixels right of a bottom left corner of the first glare map 306A may have a value of "1" to indicate that a pixel that is one hundred pixels up and two hundred pixels right of a bottom left corner of the first image 304A does include glare 312A.

In some implementations, the capture device 302 can detect glare based on a glare map evaluation function. For example, the glare map evaluation function can identify elliptical portions of the first image 304A that are much whiter than adjacent portions and then indicate those elliptical portions as including glare. For example, the capture device 302 can detect the glare using an image processing algorithm. The capture device 302 can detect the location of the glare using, for example edge detection. For example, the capture device can detect the edges of the glare 312A within the first image 304A by identifying abrupt changes in contrast, brightness, or color between the region of the first image 304A that includes the glare 312A and the region of the first image 304A that does not include the glare 312A. The glare map evaluation function can receive an image as input and output a glare map 306A corresponding to the input. For example, a glare map evaluation function can receive the first image 304A as input and output the first glare map 306A as output.

The capture device 302 can store the first image 304A in the buffer for a reconstructed image as an initial reconstructed image 314A. Similarly, the capture device 302 can store the first glare map 306A in the buffer for a reconstructed glare map as an initial reconstructed glare map 308A. For example, as shown in FIG. 3A the first image 304A and the initial reconstructed image 314A are identical and the first glare map 306A and the initial reconstructed glare map 308A are identical.

As shown in FIG. 3B, the capture device 302 obtains a second image 304B of document 310. For example, the capture device 302 obtains a second image 304B of the document 310 showing a circular area on the left side of the second image 304B that shows glare 312B. In response, the capture device 302 can register the second image 304B with the buffered reconstructed image 314A. In some examples, when processing the second image 304B in a series of images, the reconstructed image 314A is identical to the first image, therefore, the second image 304B can be registered to the first image 304A.

The capture device 302 can register the second image 304B with the buffer for the reconstructed image 314A by re-mapping the second image 304B so that the document 310 shown in the second image 304B aligns with the document 310 shown in the buffer for the reconstructed image 314A. For example, the capture device 302 can stretch, shrink, zoom, or crop portions of the second image 304B so that the coordinates of pixels in the second image 304B that show the document 310 correspond to the same coordinates of pixels that show the document 310 in the reconstructed image 314A as stored in the buffer. Re-mapping can use edge detection to detect edges of document 310 in the second image 304B and the reconstructed image 314A, and then re-map edges of the document 310 in the second image 304B to the same location of edges of the document 310 in the reconstructed image 314A.

After the capture device 302 registers the second image 304B with the reconstructed image 314A, the capture device 302 can generate a second glare map 306B that indicates the presence of glare 312B in the middle of the second image 304B. For example, the capture device 302 can use the glare map evaluation function on the registered second image 304B.

After the capture device 302 generates the second glare map 306B, the capture device 302 can use the second glare map 306B to identify portions of the registered second image 304B that should be added to the buffer for the reconstructed image 314A. For example, the capture device 302 can use the second glare map 306B to identify a middle portion of the registered second image 304B does not show glare and should be used to replace a middle portion of the reconstructed image 314A that does show glare 316A.

The capture device 302 can identify portions of the registered second image 304B that should be added to the buffer for the reconstructed image 314A by comparing the initial reconstructed glare map 308A with the second glare map 306B. For example, the capture device 302 can identify pixels of the initial reconstructed glare map 308A that indicate the presence of glare 3012A and determine whether the same pixels in the second glare map 306B indicate the presence of glare 312B in the registered second image 304B.

In response to determining that the same pixels in the second glare map 306B do not indicate the presence of glare 312B in the registered second image 304B, the capture device 302 can identify the pixels of the registered second image 304B as pixels that should be added to the buffer for the reconstructed image 314A. Conversely, in response to determining that the same pixels in the second glare map 306B indicate the presence of glare 312B in the registered second image 304B, the capture device 302 may not identify those pixels of the registered second image 304B as pixels that should be added to the buffer for the reconstructed image 314A.

In some implementations, the capture device 302 can perform a "NOT" operation on every pixel in the second glare map 306B, perform an "AND" operation on that result with the initial reconstructed glare map 314A, to identify any pixel in the registered second image 304B that corresponds with a resulting pixel with a value of "1" as a pixel that should be added to the buffer for the reconstructed image 314A.

For example, as shown in FIG. 3B, the capture device 302 can identify that the initial reconstructed glare map 308A indicates a circular area in the middle has glare 312A and that the second glare map 306B indicates the absence of glare on a right side of that circular area in the middle. The capture device 302 can replace pixels of the reconstructed image 314A that correspond to the right side of that circular area in the middle with the replacement pixels from the second image 304B to produce an updated reconstructed image 314B. The replaced pixels are indicated by region 320B in reconstructed image 314B. The capture device, 302 can generate an updated reconstructed glare map 308B to show only the remaining glare 316B in reconstructed image 314B and indicates that glare is no longer shown on a right side of that circular area in the middle. The capture device 302 can generate the updated reconstructed glare map 308B by setting the value of every pixel where content was copied from the second image 304b to the reconstructed image 314A from a value of "1" to a value of "0" to indicate that glare is no longer shown in the corresponding pixel of the reconstructed image 314B. For example, the capture device 302 can update the reconstructed glare map 308A by performing an "AND" operation between the initial reconstructed glare map 308A with the second glare map 306B to provide intermediate reconstructed glare map 308B.

As shown in FIG. 3C, the capture device 302 can repeat the process done with the second image 304B for a third image 304C that shows glare 312C on a right side of a document 310 in the third image 304C so that a final reconstructed image 314C does not show any glare. For example, the capture device 302 can identify that reconstructed glare map 308B indicates an oval area in the middle has glare 316B and that the third glare map 306C indicates the absence of glare 312C in the oval area. The capture device 302 can replace pixels of the reconstructed image 314B that correspond to the oval area with the replacement pixels from the third image 304C to produce the final reconstructed image 314C. The replaced pixels are indicated by region 320C in reconstructed image 314C. The capture device, 302 can generate an updated reconstructed glare map 308C to show that there is no remaining glare in reconstructed image 314C. As shown in FIG. 3C, the final reconstructed glare map 308C does not indicate that any glare is present in the reconstructed image 314C. In some examples, the capture device 302 identifies the completion of process 300 upon detecting no indications of glare (e.g., binary "1's") in the reconstructed glare map 308C.

As described in this example, the capture device 302 may not need to use a glare map evaluation function on a buffer for a reconstructed image to generate a reconstructed glare map. Instead, the capture device 302 can generate an initial reconstructed glare map from the glare map for a first image 304A, and then update the reconstructed glare map based on additional glare maps for additional images.

As shown in FIGS. 3A-3C, the capture device 302 can continue analyzing additional images until a reconstructed glare map does not indicate glare in the buffer for the reconstructed image. However, in some cases there may be insufficient images to generate a reconstructed image that does not include glare. Accordingly, the capture device 302 can repeat the process until the capture device 302 detects that no additional images are available to analyze. The capture device 302 can then use the final reconstructed image 314C with the final reconstructed glare map 308C that indicates portions of the final reconstructed image that include glare so are likely unusable.

In some implementations, the capture device 302 can obtain later images that do not include the entire document. Accordingly, the capture device 302 can reconstruct an image of the document from portions of the images that include different portions of the document. The system can consider any portion of the document not shown in the image as corresponding to showing glare in the glare map.

Figure 4:
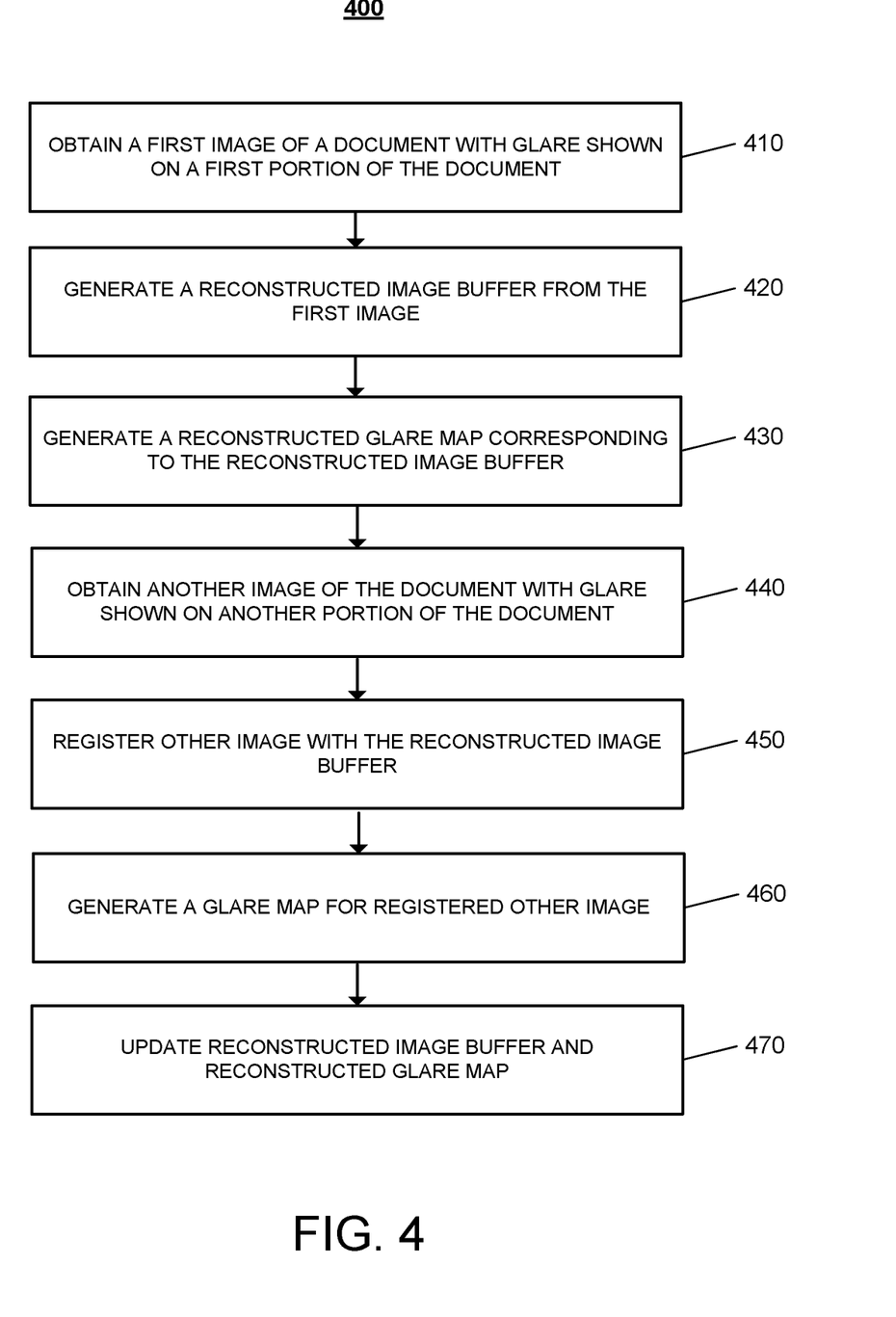
FIG. 4 is a flowchart of the process illustrated in FIGS. 3A-3C for reduction of glare in imaging a document, according to implementations of the present disclosure.

FIG. 4 is a flowchart of an example process 400 for reduction of glare in imaging a document. The process 400 includes obtaining a first image 304A of a document with glare shown on a first portion of the document (410). For example, the capture device 302 can obtain a first image 304A with glare shown in a circular area in the middle of the image.

The process 400 includes generating a reconstructed image buffer from the first image 304A (420). For example, the capture device 302 can copy the entire first image 304A into a buffer for the reconstructed image so that the pixel contents of the first image 304A and the buffer for the reconstructed image are identical.

The process 400 includes generating a reconstructed glare map corresponding to the reconstructed image buffer (430). For example, the capture device 302 can input the first image 304A into a glare map evaluation function and store the output in a buffer for the reconstructed glare map.

The process 400 includes obtaining another image of the document with glare shown on another portion of the document (440). For example, the capture device 302 can obtain a second image 304B of the document with glare shown on a left side of the image.

The process 400 includes registering the other image with the reconstructed image buffer (450). For example, the capture device 302 can detect edges of a document in the second image 304B and edges of a document in the reconstructed image, and modify the second image 304B so that the edges of the document in the second image 304B are in the same location in the second image 304B as the edges of the document in the reconstructed image.

The process 400 includes generating a glare map for the registered other image (460). For example, the capture device 302 can input the second image 304B that has been modified in (450) into a glare map evaluation function and receive the glare map for the modified second image 304B as output.

The process 400 includes updating the reconstructed image buffer and reconstructed glare map (470). For example, the capture device 302 can identify portions in the reconstructed glare map that indicate glare where the corresponding portions in the glare map for the modified second image 304B do not indicate glare, copy those portions of the modified second image 304B into the buffer for the reconstructed image, and update the value of the corresponding portions in the reconstructed glare map to not indicate glare in the reconstructed image.

The capture device 302 can repeat (440)-(470) until no other images of the document are available or the reconstructed glare map indicates that no glare is in the reconstructed image, whichever comes first.

Figure 5:
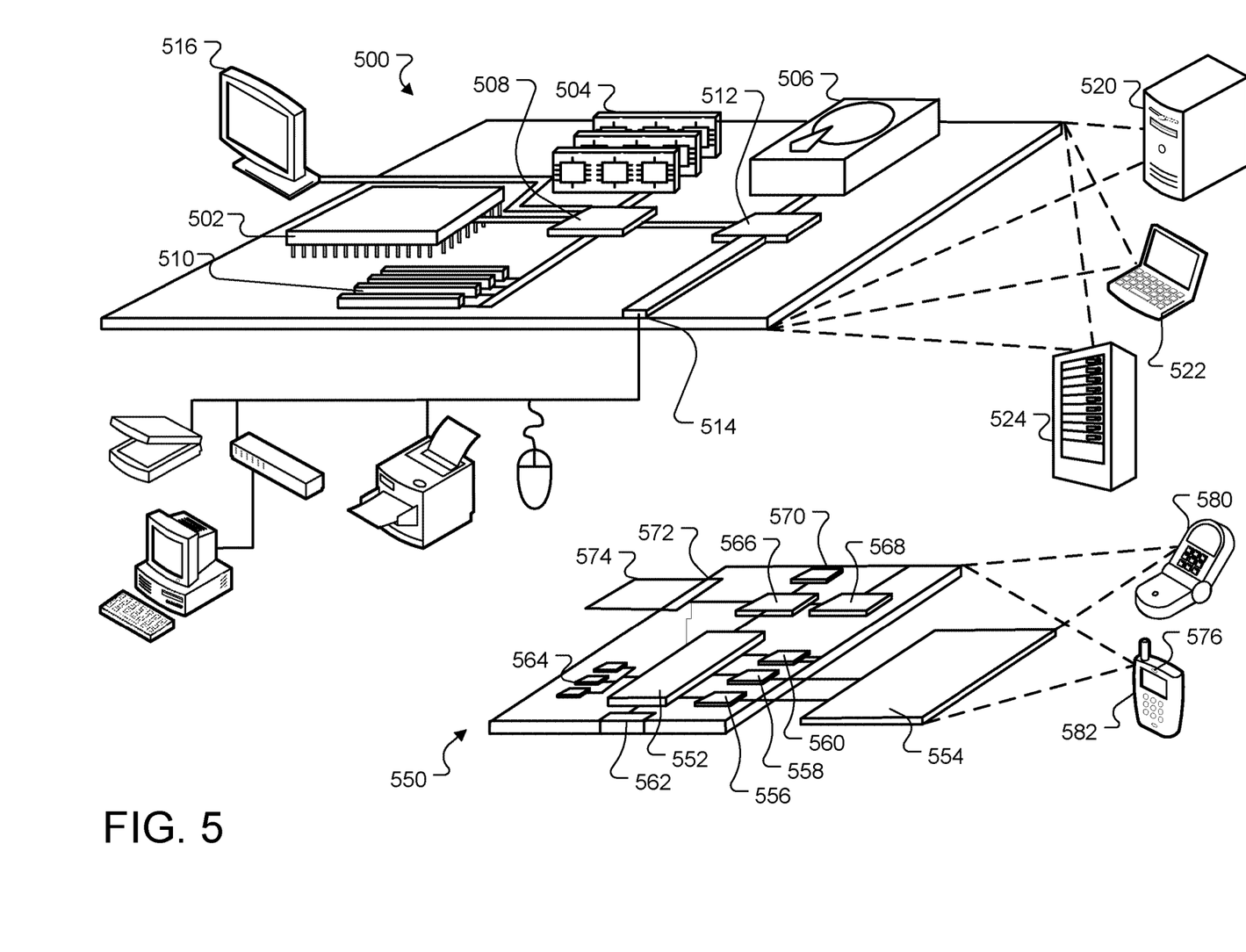
FIG. 5 is a diagram of exemplary computing devices, according to implementations of the present disclosure.

FIG. 5 shows an example of a computing device 500 and a mobile computing device 550 that can be used to implement the techniques described herein. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and can be mounted on a common motherboard or in other manners as appropriate. The processor 502 can process instructions for execution within the computing device 500, including instructions stored in the memory 504 or on the storage device 506 to display graphical information for a graphical user interface (GUI) on an external input/output device, such as a display 516 coupled to the high-speed interface 508. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 504 stores information within the computing device 500. In some implementations, the memory 504 is a volatile or non-volatile memory unit or units. In some implementations, the memory 504 is a non-volatile memory unit or units. The memory 504 can also be another form of computer-readable medium, such as a magnetic or optical disk.

The storage device 506 is capable of providing mass storage for the computing device 500. In some implementations, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. In addition, it can be implemented in a personal computer such as a laptop computer 522. It can also be implemented as part of a rack server system 524. Alternatively, components from the computing device 500 can be combined with other components in a mobile device, such as a mobile computing device 550. Each of such devices can contain one or more of the computing device 500 and the mobile computing device 550, and an entire system can be made up of multiple computing devices communicating with each other.

The mobile computing device 550 includes a processor 552, a memory 564, an input/output device such as a display 554, a communication interface 566, a transceiver 568, and a camera 576, among other components. The mobile computing device 550 can also be provided with a storage device, such as a micro-drive or other device, to provide additional storage. Each of the processor 552, the memory 564, the display 554, the communication interface 566, and the transceiver 568, are interconnected using various buses, and several of the components can be mounted on a common motherboard or in other manners as appropriate.

The processor 552 can execute instructions within the mobile computing device 550, including instructions stored in the memory 564. The processor 552 can be implemented as a chipset of chips that include separate and multiple analog and digital processors. The processor 552 can provide, for example, for coordination of the other components of the mobile computing device 550, such as control of user interfaces, applications run by the mobile computing device 550, and wireless communication by the mobile computing device 550.

The processor 552 can communicate with a user through a control interface 558 and a display interface 556 coupled to the display 554. The display 554 can be, for example, a TFT (Thin-Film-Transistor Liquid Crystal Display) display or an OLED (Organic Light Emitting Diode) display, or other appropriate display technology. The display interface 556 can include appropriate circuitry for driving the display 554 to present graphical and other information to a user. The control interface 558 can receive commands from a user and convert them for submission to the processor 552. In addition, an external interface 562 can provide communication with the processor 552, so as to enable near area communication of the mobile computing device 550 with other devices. The external interface 562 can provide, for example, for wired communication in some implementations, or for wireless communication in other implementations, and multiple interfaces can also be used.

The memory 564 stores information within the mobile computing device 550. The memory 564 can be implemented as one or more of a computer-readable medium or media, a volatile memory unit or units, or a non-volatile memory unit or units. An expansion memory 574 can also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 can include instructions to carry out or supplement the processes described above, and can include secure information also. Thus, for example, the expansion memory 574 can be provided as a security module for the mobile computing device 550, and can be programmed with instructions that permit secure use of the mobile computing device 550. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, instructions are stored in an information carrier that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 can communicate wirelessly through the communication interface 566, which can include digital signal processing circuitry where necessary. The communication interface 566 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 568 using a radio-frequency. In addition, short-range communication can occur, such as using a Bluetooth, WiFi, or other such transceiver (not shown). In addition, a GPS (Global Positioning System) receiver module 570 can provide additional navigation- and location-related wireless data to the mobile computing device 550, which can be used as appropriate by applications running on the mobile computing device 550.

The mobile computing device 550 can also communicate audibly using an audio codec 560, which can receive spoken information from a user and convert it to usable digital information. The audio codec 560 can likewise generate audible sound for a user, such as through a speaker, e.g., in a handset of the mobile computing device 550. Such sound can include sound from voice telephone calls, may include recorded sound (e.g., voice messages, music files, etc.) and may also include sound generated by applications operating on the mobile computing device 550.

The mobile computing device 550 can be implemented in a number of different forms, as shown in the figure. For example, it can be implemented as a cellular telephone 580. The mobile computing device 550 can also be implemented as part of a smart-phone 582, tablet computer, personal digital assistant, or other similar mobile device.

What is claimed is:

1. A computer implemented glare reduction method executed by one or more processors, the method comprising:
   obtaining, by the one or more processors, a first image of a document, the first image including first glare shown on a first portion of the document;
   detecting, in the first image and by the one or more processors, the first glare shown on the first portion of the document;
   in response to detecting the first glare in the first image, obtaining, by the one or more processors, a second image of the document, the second image including second glare shown on a second portion of the document; and
   generating, by the one or more processors from the first image and the second image, a third image of the document that includes less glare than the first glare in the first image and less glare than the second glare in the second image, wherein the generating of the third image comprises:
      generating a first glare map from the first image, the first glare map indicating a location of the first portion of the document that includes the first glare;
      registering the second image to the first image to provide a registered image;
      generating a second glare map from the registered image, the second glare map indicating a location of the second portion of the document that includes the second glare; and
      generating, from the first image and the registered image, the third image based on the first glare map and the second glare map.

2. The method of claim 1, further comprising in response to detecting the first glare in the first image, providing, by the one or more processors, an indication on a display to obtain a second image of the document.

3. The method of claim 1, wherein obtaining the second image of the document comprises:
in response to detecting the first glare in the first image, capturing a stream of multiple images, wherein the second image is one of the multiple images.

4. The method of claim 1, further comprising determining that the third image satisfies a threshold value for a reduction of glare based on a comparison with one or more document templates.

5. The method of claim 1, wherein the third image is a reconstruction of the first image using a set of pixels from the registered image that do not include the second glare.

6. The method of claim 1, further comprising:
in response to determining that the third image includes a third glare, generating a third glare map indicating a location of a third portion of the document that includes the third glare;
obtaining a fourth image of the document, the fourth image including fourth glare shown on a fourth portion of the document;
registering the fourth image to the third image to provide a new registered image;
generating a fourth glare map from the new registered image, the fourth glare map indicating a location of the fourth portion of the document that includes the fourth glare; and
generating, from the third image and the new registered image, a fifth image of the document based on the third glare map and the fourth glare map, wherein the fifth image includes less glare than the third glare in the third image and less glare than the fourth glare in the fourth image.

7. An apparatus comprising:
one or more processors; and
one or more data stores coupled to the one or more processors having instructions to reduce glare in digital images stored thereon which, when executed by the one or more processors, causes the one or more processors to perform operations comprising:
obtaining a first image of a document, the first image including first glare shown on a first portion of the document;
detecting, in the first image, the first glare shown on the first portion of the document;
in response to detecting the first glare in the first image, obtaining a second image of the document, the second image including second glare shown on a second portion of the document; and
generating, from the first image and the second image, a third image of the document that includes less glare than the first glare in the first image and less glare than the second glare in the second image, wherein the generating of the third image comprises:
generating a first glare map from the first image, the first glare map indicating a location of the first portion of the document that includes the first glare;
registering the second image to the first image to provide a registered image;
generating a second glare map from the registered image, the second glare map indicating a location of the second portion of the document that includes the second glare; and
generating, from the first image and the registered image, the third image based on the first glare map and the second glare map.

8. The apparatus of claim 7, wherein the operations further comprise in response to detecting the first glare in the first image, providing, by the one or more processors, an indication on a display to obtain a second image of the document.

9. The apparatus of claim 7, wherein obtaining the second image of the document comprises:
in response to detecting the first glare in the first image, capturing a stream of multiple images, wherein the second image is one of the multiple images.

10. The apparatus of claim 7, wherein the operations further comprise determining that the third image satisfies a threshold value for a reduction of glare based on a comparison with one or more document templates.

11. The apparatus of claim 7, wherein the third image is a reconstruction of the first image using a set of pixels from the registered image that do not include the second glare.

12. The apparatus of claim 7, wherein the operations further comprise:
in response to determining that the third image includes a third glare, generating a third glare map indicating a location of a third portion of the document that includes the third glare;
obtaining a fourth image of the document, the fourth image including fourth glare shown on a fourth portion of the document;
registering the fourth image to the third image to provide a new registered image;
generating a fourth glare map from the new registered image, the fourth glare map indicating a location of the fourth portion of the document that includes the fourth glare; and
generating, from the third image and the new registered image, a fifth image of the document based on the third glare map and the fourth glare map, wherein the fifth image includes less glare than the third glare in the third image and less glare than the fourth glare in the fourth image.

13. A computer implemented glare reduction method executed by one or more processors, the method comprising:
obtaining, by the one or more processors, a first image of a document, the first image including first glare shown on a first portion of the document;
detecting, in the first image and by the one or more processors, the first glare shown on the first portion of the document;
in response to detecting the first glare in the first image, obtaining, by the one or more processors, a second image of the document, the second image including second glare shown on a second portion of the document; and
generating, by the one or more processors from the first image and the second image, a third image of the document that includes less glare than the first glare in the first image and less glare than the second glare in the second image, wherein the generating of the third image comprises:
extracting a first set of features from the first image and a second set of features from the second image; and
generating the third image by populating a document template with, at least, the first set of features and the second set of features.

14. The method of claim 13, further comprising in response to detecting the first glare in the first image, providing, by the one or more processors, an indication on a display to obtain a second image of the document.

15. The method of claim 13, wherein the obtaining of the second image of the document comprises:

in response to detecting the first glare in the first image, capturing a stream of multiple images, wherein the second image is one of the multiple images.

16. The method of claim 13, further comprising determining that the third image satisfies a threshold value for a reduction of glare based on a comparison with one or more document templates.

17. The method of claim 13, wherein the document template specifies a location and attribute of each feature of the first set of features and the second set of features.

18. The method of claim 13, wherein the first set of features and the second set of features comprise at least one of text, an images, or a type of data.

* * * * *